(12) United States Patent
Huang et al.

(10) Patent No.: US 10,515,640 B2
(45) Date of Patent: Dec. 24, 2019

(54) GENERATING DIALOGUE BASED ON VERIFICATION SCORES

(71) Applicant: INTEL CORPORATION, Santa Clara, CA (US)

(72) Inventors: Jonathan Huang, Pleasanton, CA (US); David Pearce, El Dorado Hills, CA (US); Willem M. Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 15/806,667

(22) Filed: Nov. 8, 2017

(65) Prior Publication Data

US 2019/0027152 A1   Jan. 24, 2019

(51) Int. Cl.

| | |
|---|---|
| *G10L 21/00* | (2013.01) |
| *G10L 17/22* | (2013.01) |
| *G10L 17/06* | (2013.01) |
| *G10L 25/60* | (2013.01) |
| *G10L 21/0208* | (2013.01) |
| *G10L 17/02* | (2013.01) |
| G10L 15/08 | (2006.01) |
| G10L 15/18 | (2013.01) |
| G10L 17/12 | (2013.01) |

(52) U.S. Cl.
CPC .............. *G10L 17/22* (2013.01); *G10L 17/02* (2013.01); *G10L 17/06* (2013.01); *G10L 21/0208* (2013.01); *G10L 25/60* (2013.01); G10L 15/18 (2013.01); G10L 17/12 (2013.01); G10L 2015/088 (2013.01)

(58) Field of Classification Search
CPC ......... G10L 15/08; G10L 15/22; G10L 17/04; G10L 17/06; G10L 17/24; G10L 15/1815; G10L 15/1822; G10L 15/24; G10L 17/10; G10L 17/12; G10L 17/20; G10L 25/54; G10L 25/93
USPC ....... 704/236, 246, 251, 234, 239, 240, 244, 704/250, 254, 256.1, 270.1, 275, 270
See application file for complete search history.

(56) References Cited

U.S. PATENT DOCUMENTS

| | | | |
|---|---|---|---|
| 5,913,192 A * | 6/1999 | Parthasarathy | ......... G10L 17/24 704/244 |
| 6,401,063 B1 * | 6/2002 | Hebert | .................... G10L 17/04 704/234 |

(Continued)

OTHER PUBLICATIONS

Wu et al., ("Spoofing and countermeasures for speaker verification: a survey", Preprint submitted to Speech Communication, Sep. 30, 2014, pp. 1-22). (Year: 2014).*

*Primary Examiner* — Vijay B Chawan
(74) *Attorney, Agent, or Firm* — International IP Law Group, P.L.L.C.

(57) ABSTRACT

An example apparatus for generating dialogue includes an audio receiver to receive audio data including speech. The apparatus also includes a verification score generator to generate a verification score based on the audio data. The apparatus further includes a user detector to detect that the verification score exceeds a lower threshold but does not exceed a higher threshold. The apparatus includes a dialogue generator to generate dialogue to solicit additional audio data to be used to generate an updated verification score in response to detecting that the verification score exceeds a lower threshold but does not exceed a higher threshold.

22 Claims, 7 Drawing Sheets

(56) References Cited

U.S. PATENT DOCUMENTS

| | | | | |
|---|---|---|---|---|
| 6,728,679 | B1* | 4/2004 | Strubbe | G06F 3/011 704/270.1 |
| 6,813,341 | B1* | 11/2004 | Mahoney | G06Q 10/087 379/88.01 |
| 6,964,023 | B2* | 11/2005 | Maes | G06F 3/0481 704/E15.041 |
| 7,010,484 | B2* | 3/2006 | Lin | G10L 15/08 704/236 |
| 9,484,037 | B2* | 11/2016 | Aley-Raz | G10L 17/24 |
| 9,741,346 | B2* | 8/2017 | Aviles-Casco | G10L 17/04 |
| 2002/0135618 | A1* | 9/2002 | Maes | G06F 3/0481 715/767 |
| 2003/0083876 | A1* | 5/2003 | Lin | G10L 15/08 704/251 |
| 2004/0186724 | A1* | 9/2004 | Morin | G10L 17/06 704/273 |
| 2005/0033582 | A1* | 2/2005 | Gadd | G06Q 30/02 704/277 |
| 2008/0304632 | A1* | 12/2008 | Catlin | H04M 3/4938 379/88.04 |
| 2013/0135332 | A1* | 5/2013 | Davis | G06F 16/00 345/589 |
| 2013/0226892 | A1* | 8/2013 | Ehsani | G06F 16/951 707/706 |
| 2014/0249816 | A1* | 9/2014 | Pickering | G10L 15/08 704/236 |
| 2014/0337370 | A1* | 11/2014 | Aravamudan | G10L 25/54 707/759 |
| 2015/0356974 | A1* | 12/2015 | Tani | G10L 17/04 704/239 |
| 2016/0019889 | A1* | 1/2016 | Alvarez Guevara | G10L 15/08 704/254 |
| 2016/0313868 | A1* | 10/2016 | Weng | G06F 3/017 |
| 2017/0160813 | A1* | 6/2017 | Divakaran | G06F 3/017 |
| 2018/0167678 | A1* | 6/2018 | Clerx | H04H 60/33 |

* cited by examiner

GENERATING DIALOGUE BASED ON VERIFICATION SCORES

BACKGROUND

Natural voice interfaces can use automatic speech recognition (ASR) and natural language processing (NLP) to receive spoken commands from users and perform actions in response to the spoken commands. For example, ASR can be used to convert the spoken commands into a machine-readable format. NPL can then be used to translate the machine-readable commands into one or more actions.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, natural voice interfaces may be used to one or more services in response to receiving spoken commands. For example, a natural voice interfaces may receive a spoken command and perform one or more tasks in response to the spoken command. However, some natural voice interfaces may not have the ability to recognize who is speaking. Moreover, even if some natural voice systems do include the ability to recognize who is speaking, such systems may have to make a decision on the speaker ID based on one initial input. Making decisions based on just one input may lead to errors where a user may be rejected or incorrectly identified as another person and as result may cause user frustration.

The present disclosure relates generally to techniques for automatically generating dialogue. Specifically, the techniques described herein include an apparatus, method and system for generating dialogue based on a calculated verification score. In particular, the techniques described herein may be used to determine when to generate additional dialogue for the purpose of improving a system's confidence in a voice verification score of a speaker. An example apparatus includes an audio receiver to receive audio data including speech. The apparatus can include a key phrase detector to detect a key phrase in the audio data. The apparatus also includes a verification score generator to generate a verification score based on the audio data. The apparatus further includes a user detector to detect that the verification score exceeds a lower threshold but does not exceed a higher threshold. The apparatus also further includes a dialogue generator to generate a dialogue to solicit additional audio data to be used to generate an updated verification score in response to detecting that the verification score exceeds a lower threshold but does not exceed a higher threshold.

The techniques described herein thus enable dialogue flow to be adjusted when there is uncertainty in the speaker verification scores or measures of the input signal quality indicate that speaker recognition performance will be problematic due to the environmental conditions. For example, an audio sample of the user's speech may be of low quality due to background noise or the audio sample may be too short for a high verification score. Moreover, with speaker recognition capability, the techniques may provide the ability to intelligently manage user profiles to make user-specific content recommendations and allow access to certain restricted tasks such as controlling devices or placing orders. In addition, the techniques described provide various improvements that enable an improved user experience when using speaker recognition.

Figure 1:
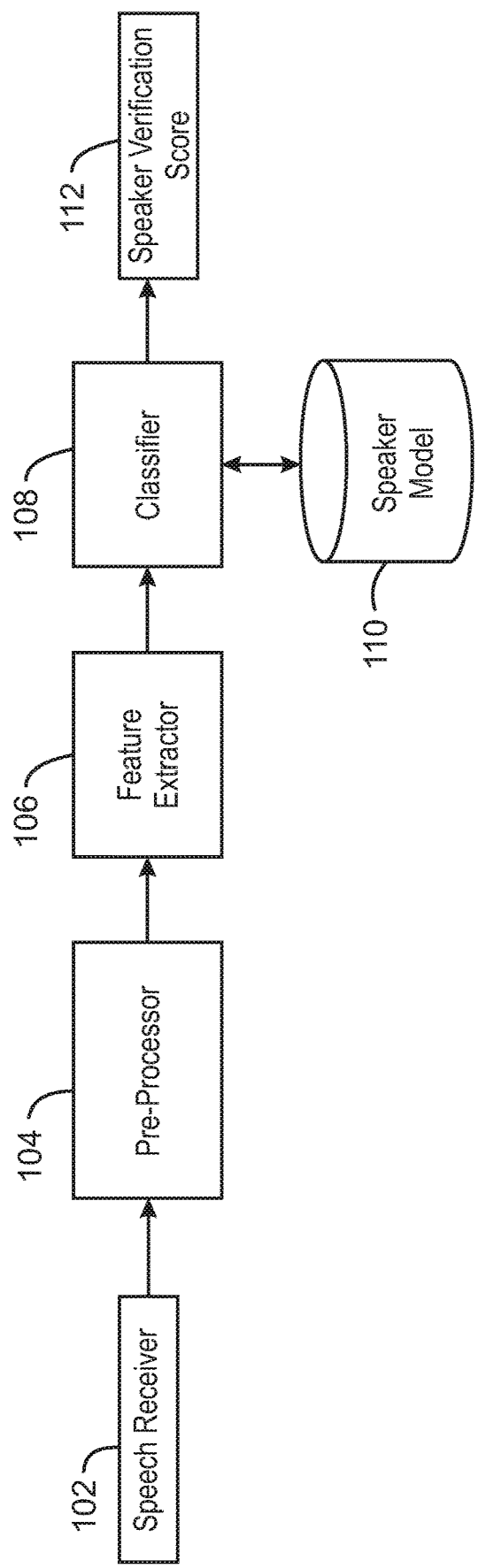
FIG. 1 is a block diagram illustrating an example processing pipeline for generating a speaker verification score.

FIG. 1 is a block diagram illustrating an example processing pipeline for generating a speaker verification score. The example system is referred to generally by the reference number 100 and can be implemented in the computing device 600 below in FIG. 6 using the method 500 of FIG. 5 below.

The example system 100 includes a speech receiver 102 communicatively coupled to a pre-processor 104. The system 100 also includes a feature extractor 106 communicatively coupled to the pre-processor 104. The system 100 also further includes a classifier 108 communicatively coupled to the feature extractor 106. The system 100 includes a speaker model 110 communicatively coupled to the classifier 108. The classifier 108 is shown outputting a speaker identification score 112.

As shown in FIG. 1, the system 100 may receive audio data including speech and output a speaker identification score 112. For example, the speaker identification score 112 may indicate the likelihood of a segment of speech being uttered by a specific enrolled speaker.

The speech receiver 102 may receive audio data including speech. For example, the audio data may include a key phrase and a command. For example, the length of the speech in the audio data may be a few seconds to a few minutes.

In some examples, the first processing stage in the processing pipeline may be signal pre-processing by a preprocessor 104 to improve the quality of speech. For example, using a microphone array, a beam-former may be used to maximize the signal-to-noise ratio (SNR) of speech by exploiting the different directionality of speech and noise. In some examples, a deverberation of room acoustic impulse responses can be applied. In some examples, other commonly used speech enhancement techniques such as spectral subtraction, Weiner filter, blind source separation, can also be employed.

The feature extractor 106 may receive the preprocessed audio data and process the preprocessed audio data to extract features from the preprocessed audio data. For example, the feature extraction may be a form of spectral analysis performed over 10s of milliseconds of speech frames.

The classifier 108 can take input features of from audio data and generate a speaker verification score 112 based on the features. For example, the classifier 108 can take an entire audio data and calculate the likelihood of the utterance matching an enrolled speaker model 110. In some examples, the classifier 108 may use a speaker model 110 to calculate the speaker verification score 112. For example, there may be a separate speaker model for each speaker that is to be detected using the classifier 108. The output of the above pipeline 100 is a numerical speaker verification score 112. For example, a higher value speaker verification score may indicate a greater likelihood of a match with a speaker model 110. In some examples, to accept or reject a speaker, a threshold value for the likelihood may be set. In some examples, the threshold may be set based on a tradeoff between a false accept rate and false reject rate, as described in greater detail with respect to FIG. 4 below. In some examples, verification score may be generated that incorporates the speaker verification score and a signal quality measure score. For example, the verification score can incorporate the output speaker verification score from the Speaker ID system and the closeness of the speaker verification score to any other talkers enrolled in the same system. The verification score can also incorporate signal quality measures taken on the input signal that correlate with expected performance of the Speaker ID system. For example, the signal quality measures may include background noise level, input signal level, signal to noise ratio, reverberation measure, the duration of the input, etc.

In some examples, the verification score can then be compared to one or more thresholds. For example, a higher and a lower threshold may be set for the verification score. For example, speech with a verification score below the lower threshold may be detected as originating from an unknown user while speech with a verification score about the higher threshold may be detected as originating from a known user. In some examples, the verification score may be between a lower and a higher threshold.

In some examples, a speech assistant may include a dialogue engine that can control the flow of the interaction with one or more users. For example, the flow of the dialogue may depend on the confidence in the output from the speaker verification system. In some examples, when there is low confidence in the output from the speaker verification system, then additional dialogue can be generated to elicit further spoken input from the user on which to base the speaker verification decision. For example, the system may generate the additional dialogue until system is confident in the score and while also not introducing noticeable additional verifications for the user. As one example, the additional dialogue can be generated when the verifications score is less than a higher threshold but higher than a lower threshold and can be generated until the verification score exceeds the higher threshold. In some examples, the design of the dialogue flow can be made to sound natural to the user and therefore the user will not be aware that the additional verification of their voice is going on in the background.

A system using the techniques described herein can thus adjust the flow of the interaction dialogue with the speech assistant depending on the confidence in the speaker verification system. In some examples, if there is high confidence in the speaker verification decision, then the system can proceed to immediately detect a known or unknown user based only on the first user input utterance. Conversely, when there is low confidence in the speaker verification decision, then the system can add additional dialogue steps in order to be able to capture more speech from the user on which to base its decision of the speaker ID/verification. In some examples, the additional input speech from the user, which can be received as additional audio data, can be used in various ways to improve the confidence in the user identity. For example, the system may generate an updated verification score using just the speech from the additional dialogue turns. In some examples, the system can combine the scores from the initial audio data and the additional audio data. The confidence or verification score of the speech may improve with the additional speech audio data for a number of reasons. For example, there may be more speech for the speaker verification score to be generated from and generally text independent systems perform better with longer input speech. In addition, in some examples, there may have been a transient external noise that occurred during the initial speech audio data while the second audio data has a better signal-to-noise ratio (SNR), thus improving the resulting verification score value.

In a home scenario example, all family members may be users of the speech assistant and may thus be enrolled in the speaker verification system. Although the number of enrolled users in this scenario may be small, their voices may be similar because they are all from the same family. Thus, the speaker verification system may therefore prone to confusion by the similarity of the voices. An adaptive system may therefore be used to elicit additional speech via generated dialogue to improve user detection in a more natural manner.

In some examples, a speaker ID system can produce one or more scores that provide a measure of the confidence in the speaker ID. In some examples, the system may detect an identity of the closest matching speaker out of the set of people enrolled and the speaker verification score or likelihood of the utterance to that speaker's model. In some examples, the system may use the score from the second closest matching speaker model. For example, the score from the second closest matching speaker model can be compared to the score from the best matching talker model and hence provide an alternative measure of confidence. In some examples, the system can use the score from all the enrolled talkers. In some examples, the system can use a score from a model that represents an average user voice.

The diagram of FIG. 1 is not intended to indicate that the example system 100 is to include all of the components shown in FIG. 1. Rather, the example system 100 can be implemented using fewer or additional components not illustrated in FIG. 1 (e.g., additional models, processing stages, output speaker verification scores, etc.). In some examples, system 100 may not include pre-processor 104. For example, the feature extractor 106 may directly process audio data received from the speech receiver 102. In another example, the feature extractor may be eliminated if the classifier is a deep neural net taking raw speech data as inputs.

Figure 2:
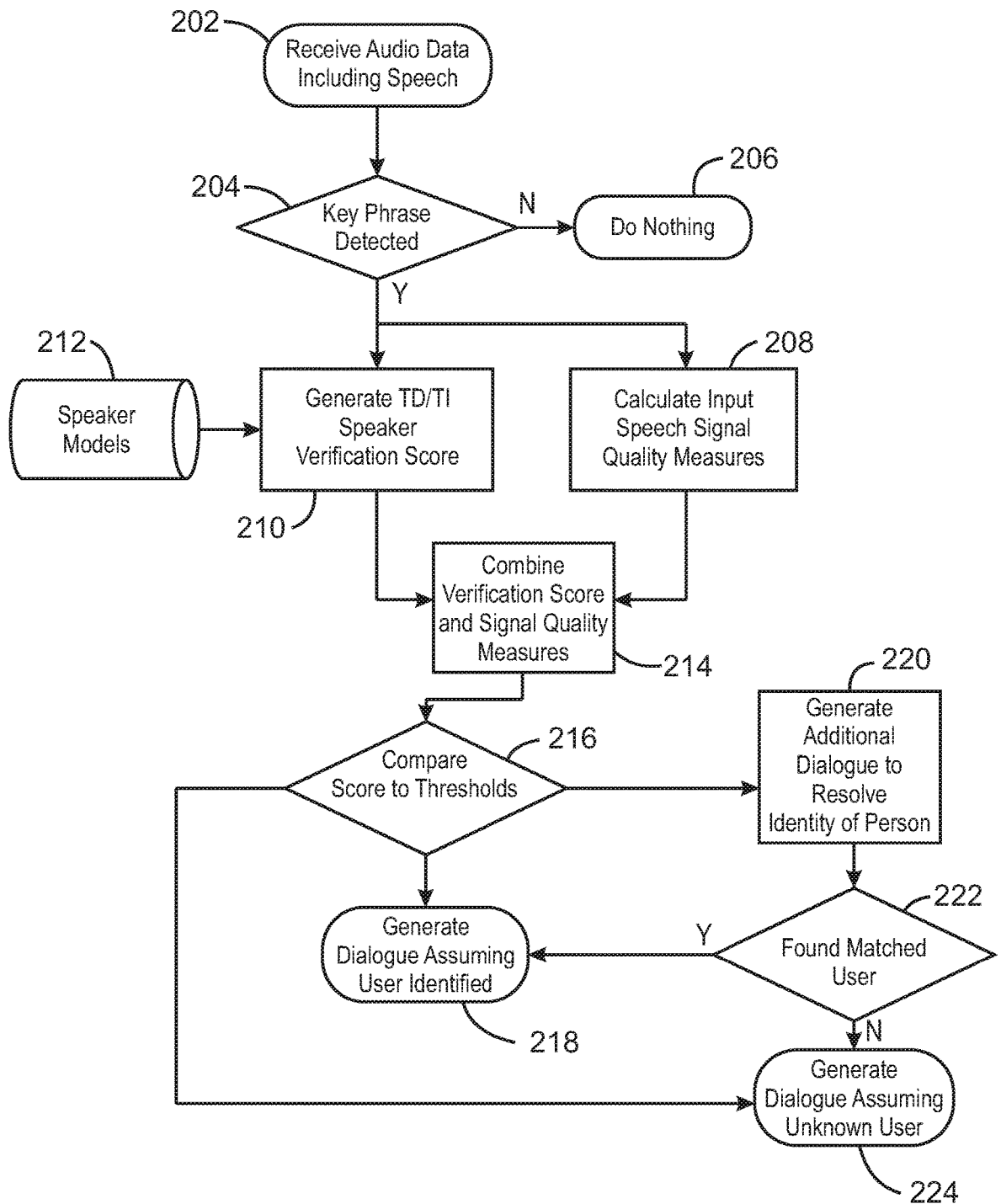
FIG. 2 is a detailed flow chart illustrating an example process for generating dialogue based on a speaker verification score.

FIG. 2 is a detailing flow chart illustrating an example process for generating dialogue based on a speaker verification score. The example process is generally referred to by the reference number 200 and can be implemented in the system 100 above or the computing device 600 below. For example, the process can be implemented using the processor 602 of computing device 600 of FIG. 6 below.

At block 202, a processor receives audio data including speech. For example, the audio data may be received from one or more microphones. In some examples, the speech may include a key phrase and a command. For example, the key phrase may be a predetermined wake up phrase.

At decision diamond 204, the processor determines whether a key phrase is detected in the audio data. For example, the processor may be continuously listening to detect when a specific wakeup key phrase is uttered. An example phrase may be: "Hello Computer. In some examples, a key phrase detection algorithm can also provide the starting and ending points of the speech waveform so that text-dependent speaker verification (TD SV) can be performed on the segment. In some examples, if the key phrase is not detected, then the process may continue at block 206. In some examples, if the key phrase is detected, then the process can continue at blocks 208 and 210.

At block 206, the processor may halt and wait for additional audio data to be received at block 202. In some examples, the processor may sleep or enter a stand-by mode, or perform other tasks. For example, the device may do nothing and revert back to default mode.

At block 208, the processor calculates input speech signal quality measures. For example, the processor can measure the quality of an input audio signal corresponding to the audio data. In some examples, the processor may calculate various signal quality measures that correlate with the ability to obtain speaker ID. For example, the measures may include an absolute noise level, an input speech signal level, a signal to noise ratio (SNR), an amount of reverberation, and a duration of the command phrase part of the input audio data.

At block 210, the processor generates text-dependent (TD) and text-independent (TI) speaker verification (SV) scores. For example, the processor may use a key phrase portion of speech in the received audio data may be used to score against TD SV. The processor may similarly use the command portion of speech in the audio data against TI SV. For example, TD SV may have far lower error rates than TI for very short duration utterances, thus the two segments of the audio data may be separated and processed separately. In some examples, the two resulting scores may be combined together to obtain a more confident classification. In some examples, a higher weight can be given to the TD portion in combining the scores. In some examples, the combined SV score can be computed for all enrolled speakers on the device. In some cases, the TD algorithm can use speech segments from both key phrase and command portions to increase the amount of acoustic data being fed into the classifier. In addition, as shown at block 212, one or more speaker models may be received at block 210. For example, a speaker model may be received for each speaker to potentially be detected.

At block 214, the processor combines the SV score and the signal quality measures to generate a verification score. For example, the speaker verification score or the input speech signal quality measures may be used separately or combined to form an overall confidence measure in the person's ID from the utterance spoken. In some examples, the verification score may be a score with a high score indicating a good match and a low score a poor match. In some examples, the verification score can alternatively be a likelihood. The combined verification score may be obtained by any suitable techniques. For example, the processor can generate the verification score using statistical measures, empirical measures, or machine learning, among other possible techniques for combining scores.

At decision diamond 216, the processor compares the verification score to one or more threshold to determine whether the verification score exceeds the thresholds. In some examples, the thresholds may include a lower threshold and a higher threshold. For example, if the higher threshold is exceeded, then the process may continue at block 218. In some examples, if the higher threshold is not exceeded, but the lower threshold is exceeded, then the process can continue at block 220. In some examples, if the lower threshold is not exceeded then the process may continue at block 224. For example, in order for the processor to decide whether a particular user is not someone outside the closed set, the verification score must be compared against one or more of the thresholds. In some examples, the threshold may be set for some target false accept rate (FAR) and false reject rate (FRR) of the application. As used herein, a FAR refers to a rate at which users are falsely detected as a known user. A FRR refers to a rate at which users are falsely detected as unknown users. In some examples, the thresholds may be different for the various applications. For example, some applications may tolerate higher FAR in exchange for FRR and vice versa.

At block 218, the processor continues to generate dialogue assuming a user is identified. In some examples, the processor may generate dialogue based on the detected user. For example, the processor may detect a high confidence that a person has been identified and can proceed with generating dialogue assuming the identity of the person is known. For example, generating dialogue may include the generation of statements or questions that correspond to the known user. In some examples, the processor may access a database with one or more stored preferences or other saved data associated with a known user to generate the dialogue. In some examples, the processor can also perform one or more actions in response to received additional audio data from a user. For example, the actions can be performed in response to receiving one or more commands from the known user.

At block 220, the processor generates additional dialogue to resolve the identity of a person. The processor may thus generate dialogue that does not assume any user is identified. For example, the processor may generate dialogue asking about the person's day, or other generalized dialogue. In some examples, the user may provide additional speech that the processor can use to increase the verification score above the second threshold. For example, if the verification score is between a lower threshold T1 and a higher threshold T2, this may indicate that there is some uncertainty about the identity of the user. Therefore, the processor can proceed to add further dialogue turns in order to elicit more input speech from the user on which to make a more confident determination. In some examples, this can occur for a range of reasons. For example, an enrolled speaker may have uttered the speech under some varying conditions as compared to the enrollment conditions, thus producing a poor match. For example, the varying conditions may include user sickness, user mood, background noise, room acoustics, different microphones, etc. The resulting error rates due to the varying conditions may be possibly too high for some applications. Moreover, rejecting a speaker too early may lead to user frustration. Thus, the processor may generate additional dialogue to collect more speech from the person on which to make a more informed determination as to whether the user is an enrolled user or not. In some examples, the processor can determine user identity by explicitly asking the user if he or she is the closest matching person. In some examples, depending on the level of security of a system, the processor may additionally prompt the user to answer a challenge question or provide a secret passphrase. In some examples, the processor can engage the user in conversation based on the context of the current dialogue. In some examples, the processor may inquire into additional relevant details about a user's request.

At decision diamond 222, the processor determines whether a matched user is found. For example, the matched user may be found in response to detecting the verifications score of 214 exceeds the higher threshold with respect to a particular speaker model associated with a user. In some examples, if a matched user is found, then the process may continue at block 218. Otherwise, if a matched user is not found, then the process may continue at block 224.

At block 224, the processor generates dialogue assuming an unknown user. For example, a poor match may have been obtained, and the processor may generate dialogue while continuing to assume the identity of the person is not known. In some examples, one or more functionalities may be limited. For example, if after generating additional dialogue the user identity still does not fit one of the enrolled speakers, the processor may continue the interaction as a guest user. Access to private content will be blocked, and there will be no user-specific recommendations.

In one example of a multiple user dialogue, there may be three users that are pre-enrolled, and one non-enrolled user. For example, a father may ask: "Hello computer, what's on TV tonight?" The system may reply: "Hi Brian, there's a great action movie you might like at 7 pm." A mother may also ask: "Hello computer, what's on TV tonight?" The system may reply: "Hi Liz, your favorite fashion program is on at 8." Similarly, a child of age 4 may also ask: "Hello computer, what's on TV tonight?" The system may reply: "Hi Alice, Super Happy Fun Time starts in 10 minutes." The new unenrolled user may request: "Hello computer, set an alarm for 4 am." In this case, however, the system may reply: "Hi, I'm sorry, but only house-members can set alarms." Assuming both TD and TI models are enrolled, the system can use both parts of the speech to determine the identity of the person. For example, TD SV may be applied to detected key phrases and TI SV may be applied to commands to detect each speaker. In some examples, both techniques may be used to generate a single speaker verification score to detect the speaker, and determine whether the speaker is enrolled or not enrolled with the system. Thus, specific features may be customized to or limited to users that are enrolled with the system.

As another example dialogue, an enrolled user may begin by speaking: "Hello computer, what's on TV tonight?" The processor may process this phrase using the techniques describe above. However, the phrase may receive a verification score that is between the lower threshold T1 and the higher threshold T2. The processor may thus solicit additional speech from the person to increase the verification score or confidence. For example, the processor may generate the dialogue: "Let me check out the listings for you. So, please tell me about your day while I look this up?" The user may reply with the additional speech: "I had a stressful day at work, preparing a big presentation in front of a huge audience. We're really pressed for time. I want to sit back and relax." Thus, the processor may receive this additional speech as audio data, which may result in a higher verification score. For example, the verification score may now exceed the higher threshold T2 for a speaker model associated with a user named "Dan." The processor may then generate dialogue assuming an identified user. For example, the processor may generate the dialogue: "Sorry to hear you're stressed out, Dan. To make you feel better you may consider watching game 7 of the MBH finals tonight on channel XZY starting at 7:00 p.m." In some examples, the processor may have access to private content, such as favorite settings, music, television shows, sports teams, etc. For example, the processor may access the private content associated with the identified user in response to detecting an identified user.

This process flow diagram is not intended to indicate that the blocks of the example process 200 are to be executed in any particular order, or that all of the blocks are to be included in every case. For example, the key phrase detection decision diamond 204 can be optional. In some examples, the process 200 may continue from block 202 directly to blocks 208 and 210. Further, any number of additional blocks not shown may be included within the example process 200, depending on the details of the specific implementation.

Figure 3:
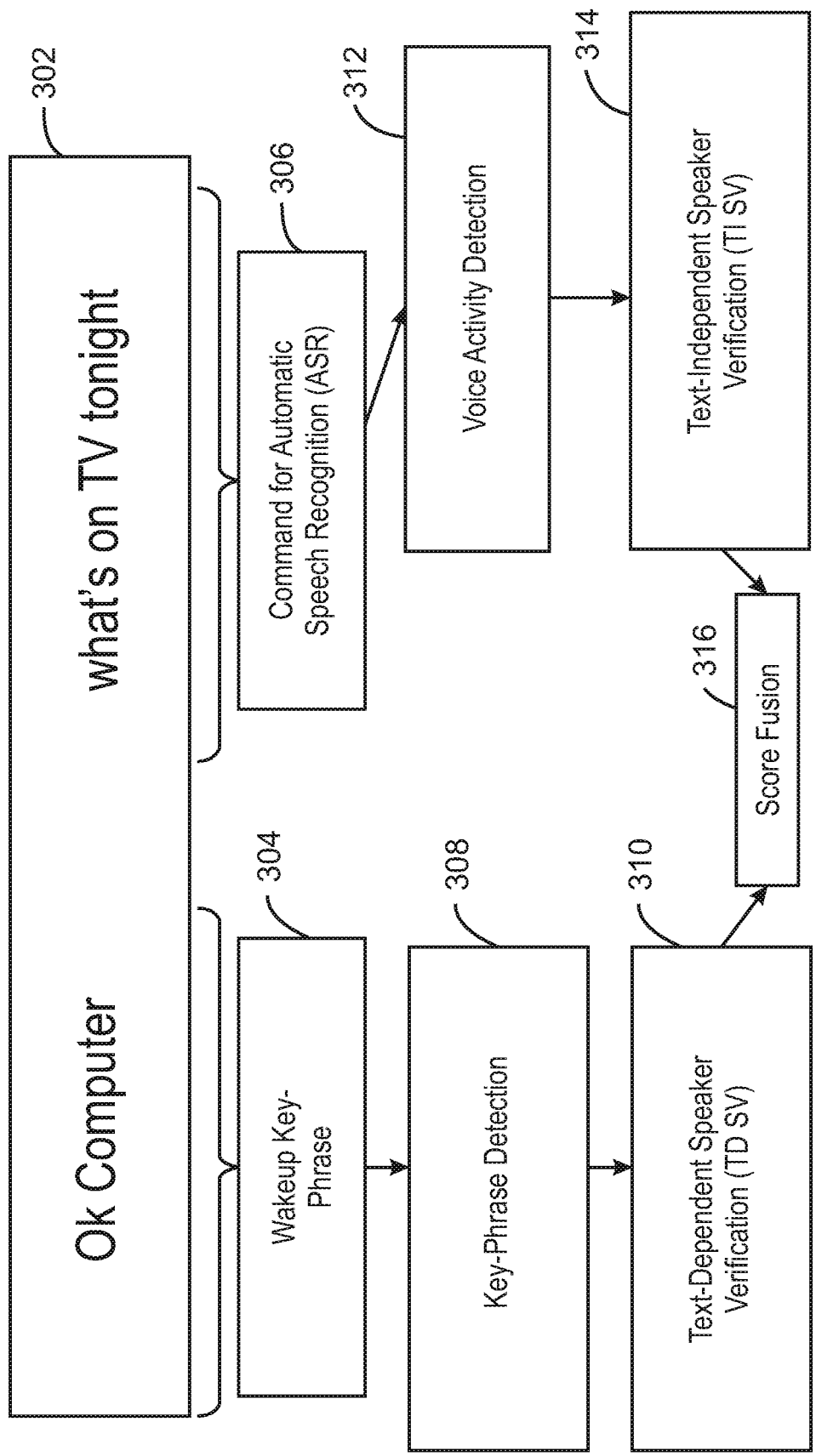
FIG. 3 is a block diagram illustrating an example generation of a speaker verification score for example audio data received from a speaker.

FIG. 3 is a block diagram illustrating a generation of a speaker verification score for example audio data received from a speaker. The example generation of the speaker verification score is generally referred to by the reference number 300 and can be implemented in the computing device 600 below. For example, the generation of the speaker verification score 300 can be generated using the processing pipeline 100 of FIG. 1, the processor 602 and speaker scorer 634 of the computing device 600 of FIG. 6 below, or the speaker scorer module 710 of the computer readable media 700 of FIG. 7 below.

FIG. 3 shows an example audio data including speech received from a user. For example, the speech may include the phrase: "Hello computer, what's on TV tonight?" For example, the part of the phrase "Hello computer" may be detected as a wakeup key phrase 304, and the part of phrase 302 "what's on TV tonight?" may be detected as a command 306 for automatic speech recognition (ASR).

At block 308, the processor detects the wakeup key phrase 304 "Hello computer" is detected as a key phrase. A variety of different techniques for key phrase detection can be used. In some examples, a very small vocabulary (of one or several words) automatic speech recognition algorithm is used to detect this key phrase. For example, one or several words may be used to detect the key phrase. In some examples, spectral features can be used in the front end, followed by a deep neural network (DNN) acoustic model with a hidden Markov model (HMM) as the key phrase model. In some examples, the function of DNN can be expanded to obviate the need of the spectral features and HMM. For example, an end-to-end DNN classifier can be used to detect key phrase from raw speech directly. As used herein, the term DNN is intended to include many alternative forms of neural network topologies and types such as a convolutional neural network (CNN), a long short-term memory (LSTM) network, a recurrent neural network (RNN), fully connected layers, etc., or any combination thereof.

At block 310, the processor performs a text-dependent speaker verification (TD SV) on the key phrase 304. For example, in text-dependent (TD), the words used to enroll a user and test user may be the same. Thus, in TD SV, it may be possible to use short passphrases to achieve EER below 1% under ideal conditions. For example, the short pass phrases may be 1-5 seconds in length such as "Hello computer." The enrollment may include only a few repetitions of the same phrase by the user to be enrolled. Thus, TD SV may be used for quickly authenticating a user with very little time and enrollment effort.

At block 312, the processor processes command 306 using voice activity detection 312. For example, voice activity detection (VAD) in a simplest form can be an energy detector. Voice can be detected when an energy of a segment exceeds the background noise level by some empirically-determined threshold. In some examples, a more sophisticated VAD could utilize a DNN to classify if a segment of audio is speech or some other kind of noise. In some examples, an automatic speech recognition can be used to detect meaningful words or phonemes corresponding to the user's language.

At block 314, the processor performs a text-independent speaker verification (TI SV). For example, TI SV may not have any constraints on enrollment and test vocabulary, which enables TI SV to recognize speakers during natural conversational speech. In some examples, TI SV may take more than a minute of speech to enroll, and may use longer test speech segments to achieve comparable EER as TD SV. For example, the command "what's on TV tonight" is twice in long as the key phrase "Hello computer."

At block 316, the processor performs a score fusion to generate a single speaker verification score. In some examples, the processor can combined the TI SV score and the TD SV score using any suitable technique to generate a combined SV score. For example, a simple average or a weighted average may be used. In some examples, as in the case of weighted average, the weighting can be determined by factors such as SNR, duration, phonetic richness of the segments, or any combination thereof.

The diagram of FIG. 3 is not intended to indicate that the example generation of the speaker verification score 300 is to include all of the components shown in FIG. 3. Rather, the example generation of the speaker verification score 300 can be implemented using fewer or additional components not illustrated in FIG. 3 (e.g., additional key phrases, commands, speech, score components, etc.).

Figure 4:
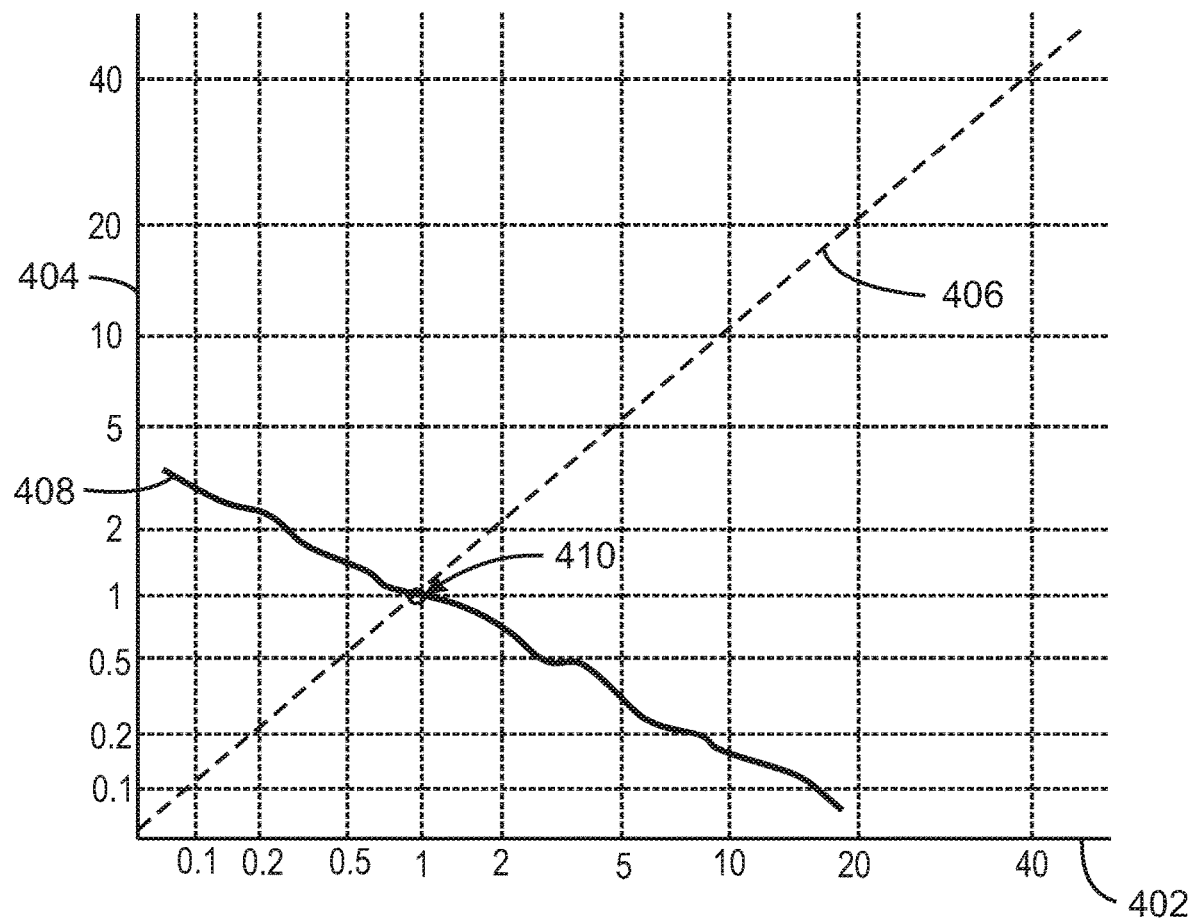
FIG. 4 is a graph illustrating an example detection error tradeoff.

FIG. 4 is a graph illustrating an example detection error tradeoff. The example detection error tradeoff is generally referred to by the reference number 400 and can be implemented in the computing device 600 below. For example, the detection error tradeoff 400 can be used by the user detector 640 of the computing device 600 of FIG. 6 below or the user detector module 716 of the computer readable media 700 of FIG. 7 below. For example, the detection error tradeoff can be used to set one or more thresholds for detecting a speaker.

FIG. 4 shows a percentage error rates 402 and 404, and an equal error rate line 406 indicating equal false accept rate (FAR) and false reject rate (FRR). The detection error plot 408 indicates all the operating regions of an example system that can be reached by choosing different values for a threshold. For example, setting high threshold value may lead to low false accept rate (FAR), but may increase false reject rate (FRR). The converse may be true with a lower threshold value. Thus, the intersection 410 of the detection error plot line 408 and the equal error rate line 406 may be used to determine a threshold that can provide both a low FAR and a low FRR. For example, the FAR and FRR at the intersection 410 of the detection error plot line 408 and the equal error rate line 406 is shown as 1%.

The diagram of FIG. 4 is not intended to indicate that the example detection error tradeoff 400 is to include all of the components shown in FIG. 4. Rather, the example detection error tradeoff 400 can be implemented using fewer or additional components not illustrated in FIG. 4 (e.g., additional dimensions, detection error plot lines, etc.).

Figure 5:
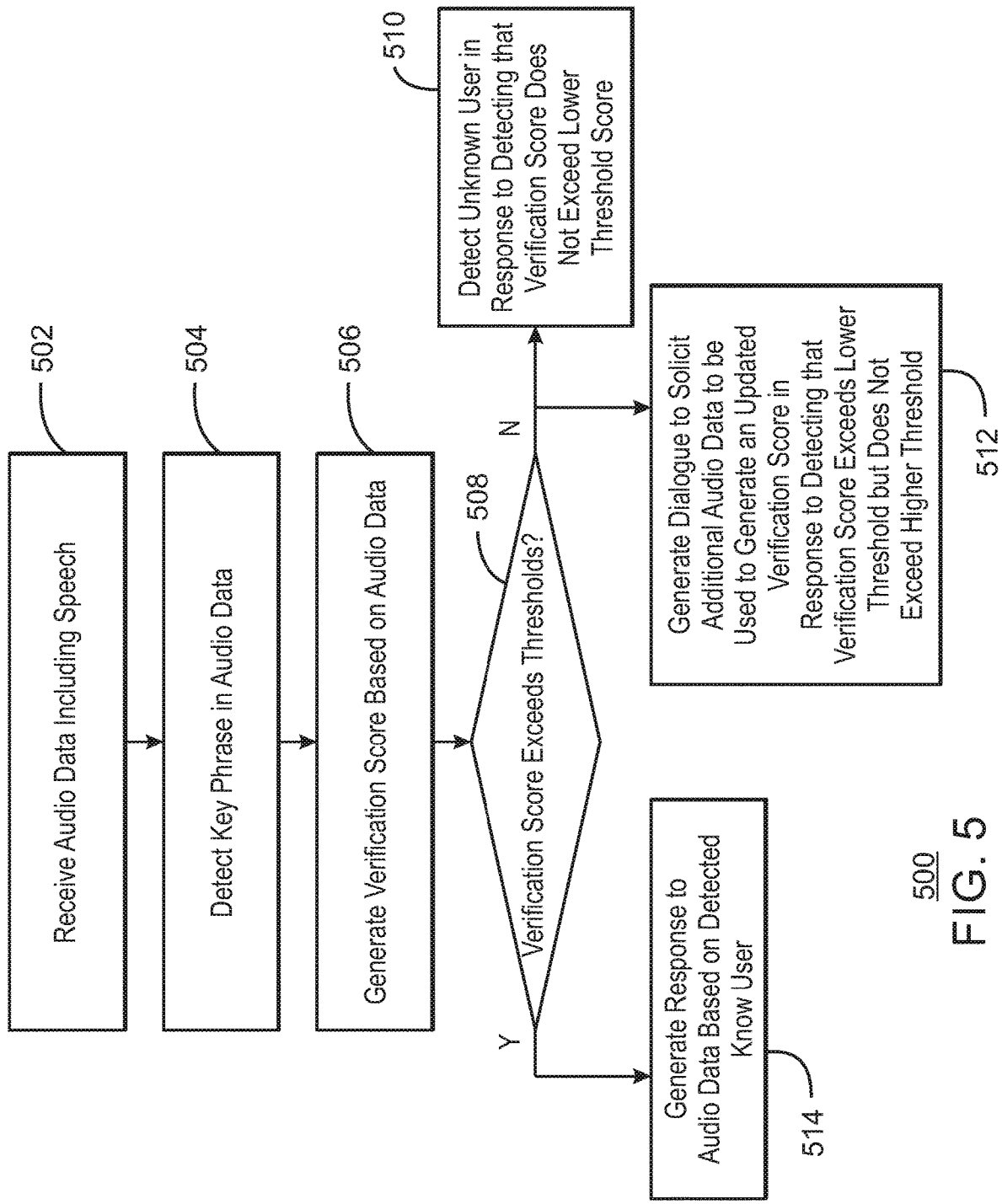
FIG. 5 is a flow chart illustrating a method for generating dialogue based on a speaker verification score.

FIG. 5 is a flow chart illustrating a method for generating dialogue based on a speaker verification score. The example method is generally referred to by the reference number 500 and can be implemented at least partially using the processing pipeline 100 of FIG. 1 above, the processor 602 of the computing device 600 of FIG. 6 below, or the computer readable media 700 of FIG. 7 below.

At block 502, a processor receives audio data including speech. For example, the audio data may be an audio signal. In some examples, the speech may include a key phrase, a command, or both.

At block 504, the processor detects a key phrase in the audio data. For example, the key phrase may be a wake-on key phrase. In some examples, the key phrase may have been recorded for each user that is enrolled.

At block 506, the processor generates a verification score based on the audio data. In some examples, the processor can generate the verification score in response to the detection of the key phrase. For example, the processor can generate a speaker verification score based on the audio data and a speaker model and generate the verification score based on the speaker verification score. In some examples, the processor can calculate a text-dependent score based on the key phrase and a text-independent score based on a command in the audio data and combine the text dependent score and the text independent score to generate a speaker verification score. For example, the processor can then generate the verification score based on the speaker verification score. In some examples, the processor can generate a signal quality score based on the audio data and generate the verification score based on the signal quality score. For example, the signal quality score can be generated based on a background noise level, an input signal level, a signal to noise ratio, a reverberation measure, a duration of the input, or any combination thereof. In some examples, the processor can generate the verification score based on the signal quality score, the speaker verification score, or both.

At decision diamond 508, the processor determines whether the verification score exceeds one or more thresholds. For example, the thresholds may include a lower threshold and a higher threshold. In some examples, the one or more thresholds may be set based on an application. For example, the one or more thresholds can be set at least in part based on target false accept rate (FAR) and false reject rate (FRR) of an application. In some examples, if the processor detects that the verification score does not exceed the lower threshold, then the method 500 may continue at block 510. In some examples, if the processor detects that the verification score exceeds a lower threshold but does not exceed a higher threshold, then the method 500 may continue at block 512. In some examples, if the processor detects that verification score exceeds both of the thresholds, then the method 500 may continue at block 514.

At block 510, the processor detects an unknown user in response to detecting that the verification score does not exceed the lower threshold score. In some examples, the processor may generate a dialogue denying access to restricted services in response to detecting an unknown user. In some examples, the processor may generate a dialogue or provide one or more unrestricted services in response to detecting the unknown user.

At block 512, the processor generates a dialogue to solicit additional audio data to be used to generate an updated verification score in response to detecting that the verification score exceeds a lower threshold but does not exceed a higher threshold.

At block 514, the processor generates a response to the audio data based on the detected known user. For example, the processor may detect a known user in response to detecting that the verification score exceeds the higher threshold score.

This process flow diagram is not intended to indicate that the blocks of the example method 500 are to be executed in any particular order, or that all of the blocks are to be included in every case. For example, the method 500 may be performed without the detection of the key phrase in the audio data in block 504. Further, any number of additional blocks not shown may be included within the example method 500, depending on the details of the specific implementation. For example, the method 500 can also include preprocessing the audio data to remove noise from the audio data. In some examples, the method 500 can include extracting features from the audio data. For example, the speaker verification score can be generated based on the extracted features.

Figure 6:
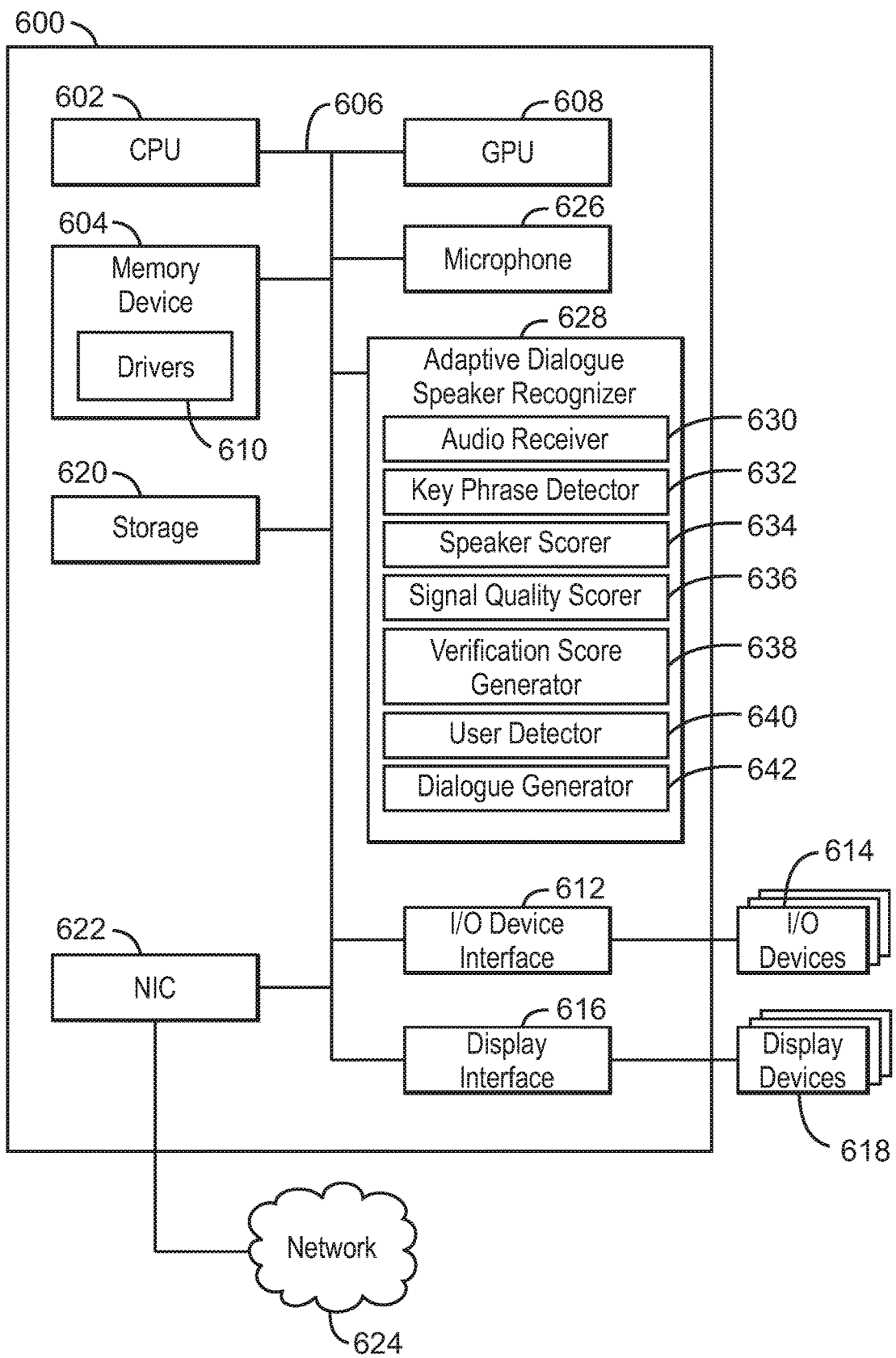
FIG. 6 is block diagram illustrating an example computing device that can generate dialogue based on a speaker verification score.

Referring now to FIG. 6, a block diagram is shown illustrating an example computing device that can generate dialogue based on a speaker verification score. The computing device 600 may be, for example, a laptop computer, desktop computer, tablet computer, mobile device, or wearable device, among others. In some examples, the computing device 600 may be a virtual assistant device. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating dialogue based on a speaker verification score. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a microphone 626. For example, the microphone 626 may a single microphone or a microphone array.

The computing device 600 further includes an adaptive dialogue speaker recognizer 628. For example, the adaptive dialogue speaker recognizer 628 can be used to generate dialogue to receive additional audio data used to detect a speaker. The adaptive dialogue speaker recognizer 628 can include an audio receiver 630, a key phrase detector 632, a speaker scorer 634, a signal quality scorer 636, a verification score generator 638, a user detector 640, and a dialogue generator 642. In some examples, each of the components 630-642 of the adaptive dialogue speaker recognizer 628 may be a microcontroller, embedded processor, or software module. The audio receiver 630 can receive audio data including speech. In some examples, the speech may include a key phrase, a command, or both. The key phrase detector 632 can detect a key phrase in the audio data. The speaker scorer 634 can generate a speaker verification score based on the audio data and a speaker model. For example, the speaker scorer 634 can calculate a text-dependent score based on the key phrase and a text-independent score based on a command in the audio data, and combine the text-dependent score and the text independent score to generate the speaker verification score. The signal quality scorer 636 can generate a signal quality score based on the audio data. For example, the signal quality score may be based on a background noise level, an input signal level, a signal to noise ratio, a reverberation measure, a duration of the input, or any combination thereof. The verification score generator 638 can generate a verification score based on the audio data. For example, the verification score generator 638 can generate the verification score in response to the detection of the key phrase. In some examples, the verification score generator can generate an updated verification score based on the additional audio data. For example, the additional audio data may be received in response to the dialogue generated by the dialogue generator 642 below. The user detector 640 can detect that the verification score exceeds a lower threshold but does not exceed a higher threshold. In some examples, the user detector 640 can detect an unknown user in response to receiving additional audio data from the user, and detect that the updated verification score exceeds a lower threshold but does not exceed a higher threshold. In some examples, the user detector 640 can detect a known user in response to detecting that the verification score exceeds the higher threshold score. In some examples, the user detector 640 can detect an unknown user in response to detecting that the verification score does not exceed the lower threshold score. The dialogue generator 642 can generate a dialogue to solicit additional audio data to be used to generate an updated verification score in response to detecting that the verification score exceeds a lower threshold but does not exceed a higher threshold. In some examples, the dialogue generator 642 can generate a response to the audio data based on the detected known user. For example, the response may include customized information, such as favorite movies, games, news, shows, etc. In some examples, the dialogue generator 642 can generate a response based on a detected unknown user. For example, the response may be a message denying access to restricted services.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. For example, the computing device 600 can also include a preprocessor to preprocess the audio data to remove noise. For example, the preprocessor can preprocess the audio data using any of the techniques described in FIG. 1 above. In some examples, the computing device 600 may also include a feature extractor to extract features from the audio data. For example, the speaker scorer 634 can generate the speaker verification score based on the extracted features. Furthermore, any of the functionalities of the audio receiver 630, the key phrase detector 632, the speaker scorer 634, the signal quality scorer 636, the verification score generator 638, the user detector 640, and the dialogue generator 642, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the adaptive dialogue speaker recognizer 628 may be implemented with an application specific integrated circuit, in logic implemented in a processor, in logic implemented in a specialized audio processing unit, or in any other device.

Figure 7:
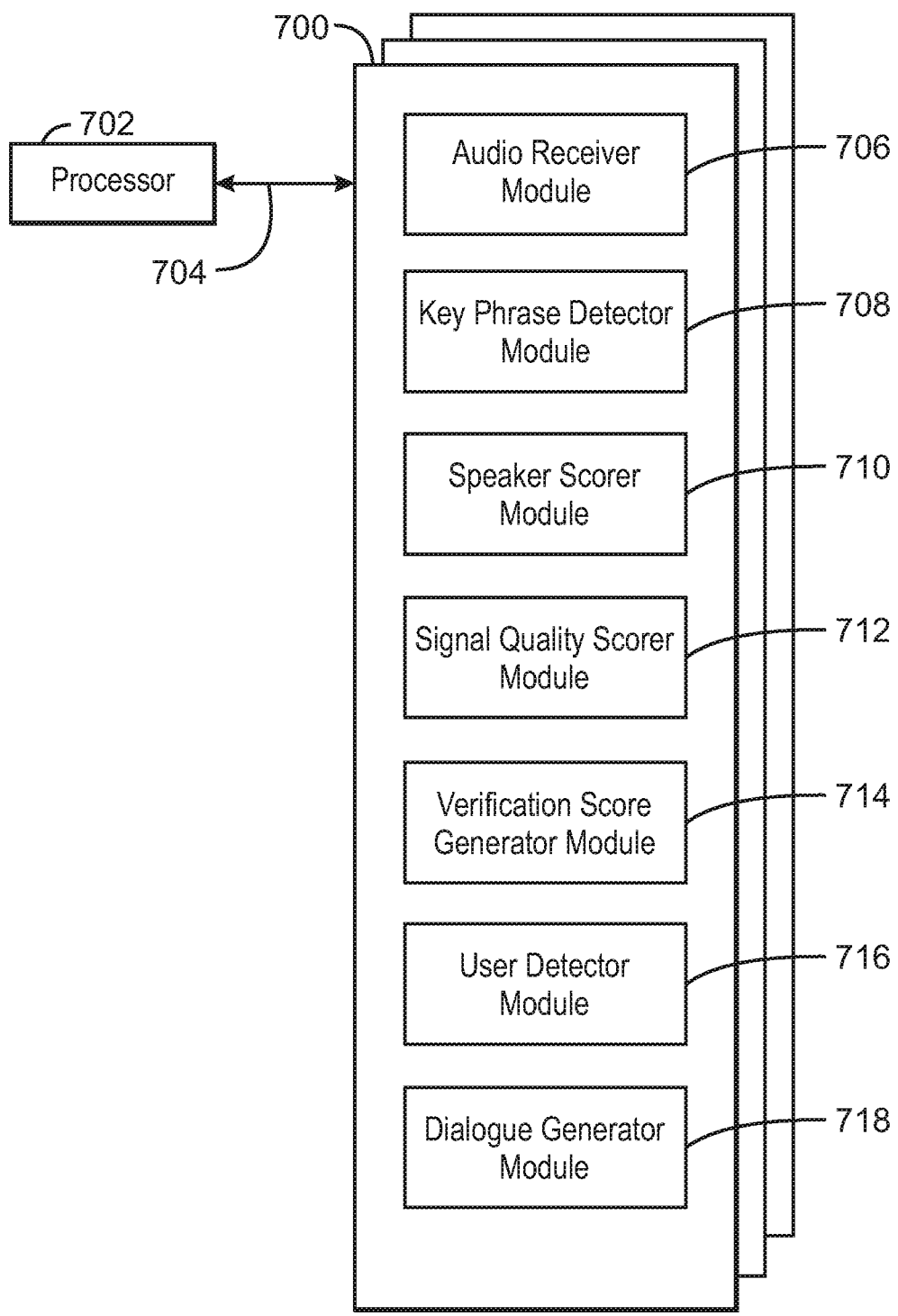
FIG. 7 is a block diagram showing computer readable media that store code for generating dialogue based on a speaker verification score.

FIG. 7 is a block diagram showing computer readable media 700 that store code for generating dialogue based on a speaker verification score. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, an audio receiver module 706 may be configured to receive audio data including speech. A key phrase detector module 708 may be configured to detect a key phrase in the audio data. A speaker scorer module 710 may be configured to generate a speaker verification score based on the audio data and a speaker model. For example, the speaker scorer 710 may be configured to calculate a text-dependent score based on the key phrase and a text-independent score based on a command in the audio data, combine the text dependent score and the text independent score to generate a speaker verification score. In some examples, the speaker scorer module 710 may be configured to generate the speaker verification score in response to detecting the key phrase in the audio data. A signal quality scorer module 712 may be configured to generate a signal quality score based on the audio data. For example, the signal quality scorer module 712 may be configured to generate a signal quality score based on a background noise level, an input signal level, a signal to noise ratio, a reverberation measure, a duration of the input, or any combination thereof. A verification score generator module 714 may be configured to generate a verification score based on the audio data in response to the detection of the key phrase. For example, the verification score generator module 714 may be configured to generate the verification score based on the speaker verification score, the signal quality score, or both. A user detector module 716 may be configured to detect that the verification score exceeds a lower threshold but does not exceed a higher threshold. In some examples, the user detector module 716 may be configured to detect an unknown user in response to receiving additional audio data from the user and detecting that the updated verification score exceeds a lower threshold but does not exceed a higher threshold. For example, the verification score generator module 714 may be configured to generate an updated verification score based on the additional audio data. In some examples, the user detector module 716 may be configured to detect a known user in response to detecting that the verification score exceeds the higher threshold score and generate a response to the audio data based on the detected known user. In some examples, the user detector module 716 may be configured to detect an unknown user in response to detecting that the verification score does not exceed the lower threshold score. A dialogue generator module 718 may be configured to generate a dialogue to solicit additional audio data to be used to generate an updated verification score in response to detecting that the verification score exceeds a lower threshold but does not exceed a higher threshold. For example, the dialogue may assume the user is an unknown user. In some examples, the dialogue generator module 718 may be configured to generate a dialogue based on a known user. For example, the dialogue may include customized information, such as favorite music, shows, places, etc.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation. For example, the computer readable media 700 may also include a preprocessor module to preprocess audio data to remove noise from the audio data. In some examples, the computer readable media 700 may include a feature extractor module to extract features from the audio data. For example, the speaker scorer 710 may be configured to generate the speaker verification score based on the extracted features. In some examples, the computer readable media 700 may include a natural language understanding (NLU) module to perform one or more actions. For example, the NLU module may perform restricted actions in response to detecting that the user is a known user. In some examples, the NLU module may return a denied access message to the dialogue generator module 718 in response to detecting an unknown user is attempting to request a restricted action. For example, the restricted actions can include accessing functionalities of one or more smart devices.

EXAMPLES

Example 1 is an apparatus for generating dialogue. The apparatus includes an audio receiver to receive audio data including speech. The apparatus also includes a verification score generator to generate a verification score based on the audio data. The apparatus further includes a user detector to detect that the verification score exceeds a lower threshold but does not exceed a higher threshold. The apparatus also further includes a dialogue generator to generate a dialogue to solicit additional audio data to be used to generate an updated verification score in response to detecting that the verification score exceeds a lower threshold but does not exceed a higher threshold.

Example 2 includes the apparatus of example 1, including or excluding optional features. In this example, the apparatus includes a key phrase detector to detect a key phrase in the audio data. The verification score generator is to generate a verification score based on the audio data in response to the detection of the key phrase.

Example 3 includes the apparatus of any one of examples 1 to 2, including or excluding optional features. In this example, the apparatus includes a speaker scorer to generate a speaker verification score based on the audio data and a speaker model. The verification score is at least in part based on the speaker verification score.

Example 4 includes the apparatus of any one of examples 1 to 3, including or excluding optional features. In this example, the apparatus includes a speaker scorer to generate a speaker verification score based on the audio data and a speaker model. The speaker scorer is to calculate a text-dependent score based on the key phrase and a text-independent score based on a command in the audio data, and combine the text-dependent score and the text independent score to generate the speaker verification score. The verification score is at least in part based on the speaker verification score.

Example 5 includes the apparatus of any one of examples 1 to 4, including or excluding optional features. In this example, the apparatus includes a signal quality scorer to generate a signal quality score based on the audio data. The verification score is at least in part based on the signal quality score.

Example 6 includes the apparatus of any one of examples 1 to 5, including or excluding optional features. In this example, the apparatus includes a signal quality scorer to generate a signal quality score based on the audio data. The signal quality score is based on a background noise level, an input signal level, a signal to noise ratio, a reverberation measure, a duration of the input, or any combination thereof. The verification score is at least in part based on the signal quality score.

Example 7 includes the apparatus of any one of examples 1 to 6, including or excluding optional features. In this example, the apparatus includes a preprocessor to preprocess the audio data to remove noise.

Example 8 includes the apparatus of any one of examples 1 to 7, including or excluding optional features. In this example, the apparatus includes a feature extractor to extract features from the audio data. A speaker scorer is to generate a speaker verification score based on the extracted features and the verification score generator is to generate the verification score based on the speaker verification score.

Example 9 includes the apparatus of any one of examples 1 to 8, including or excluding optional features. In this example, the user detector is to detect an unknown user in response to receiving the additional audio data from the user, and detect that the updated verification score exceeds a lower threshold but does not exceed a higher threshold. The verification score generator is to generate an updated verification score based on the additional audio data.

Example 10 includes the apparatus of any one of examples 1 to 9, including or excluding optional features. In this example, the user detector is to detect a known user in response to detecting that the verification score exceeds the higher threshold score, the dialogue generator to generate a response to the audio data based on the detected known user.

Example 11 is a method for generating dialogue. The method includes receiving, via a processor, audio data including speech. The method also includes generating, via the processor, a verification score based on the audio data. The method further includes detecting, via the processor, that the verification score exceeds a lower threshold but does not exceed a higher threshold. The method also further includes generating, via the processor, a dialogue to solicit additional audio data to be used to generate an updated verification score in response to detecting that the verification score exceeds a lower threshold but does not exceed a higher threshold.

Example 12 includes the method of example 11, including or excluding optional features. In this example, the method includes detecting, via the processor, a key phrase in the audio data. Generating the verification score is performed in response to the detection of the key phrase.

Example 13 includes the method of any one of examples 11 to 12, including or excluding optional features. In this example, generating the verification score includes calculating a text-dependent score based on the key phrase and a text-independent score based on a command in the audio data and combining the text dependent score and the text independent score to generate a speaker verification score and generating the verification score based on the speaker verification score.

Example 14 includes the method of any one of examples 11 to 13, including or excluding optional features. In this example, generating the verification score includes generating a signal quality score based on the audio data and generating the verification score based on the signal quality score. The signal quality score is based on a background noise level, an input signal level, a signal to noise ratio, a reverberation measure, a duration of the input, or any combination thereof.

Example 15 includes the method of any one of examples 11 to 14, including or excluding optional features. In this example, generating the verification score includes generating a signal quality score based on the audio data, generating a speaker verification score based on the audio data and a speaker model, and generating the verification score based on the signal quality score and the speaker verification score.

Example 16 includes the method of any one of examples 11 to 15, including or excluding optional features. In this example, the method includes preprocessing, via the processor, the audio data to remove noise from the audio data.

Example 17 includes the method of any one of examples 11 to 16, including or excluding optional features. In this example, the method includes extracting, via the processor, features from the audio data, generating a speaker verification score based on the extracted features, and generating the verification score based on the speaker verification score.

Example 18 includes the method of any one of examples 11 to 17, including or excluding optional features. In this example, the method includes detecting, via the processor, an unknown user in response to receiving additional audio data from the user, generating an updated verification score based on the additional audio data, and detecting that the updated verification score exceeds a lower threshold but does not exceed a higher threshold.

Example 19 includes the method of any one of examples 11 to 18, including or excluding optional features. In this example, the method includes detecting, via the processor, a known user in response to detecting that the verification score exceeds the higher threshold score and generate a response to the audio data based on the detected known user.

Example 20 includes the method of any one of examples 11 to 19, including or excluding optional features. In this example, the method includes detecting, via the processor, an unknown user in response to detecting that the verification score does not exceed the lower threshold score.

Example 21 is at least one computer readable medium for generating dialogue having instructions stored therein that direct the processor to receive audio data including speech. The computer-readable medium includes instructions that direct the processor to generate a verification score based on the audio data. The computer-readable medium also includes instructions that direct the processor to detect that the verification score exceeds a lower threshold but does not exceed a higher threshold. The computer-readable medium further includes instructions that direct the processor to generate a dialogue to solicit additional audio data to be used to generate an updated verification score in response to detecting that the verification score exceeds a lower threshold but does not exceed a higher threshold.

Example 22 includes the computer-readable medium of example 21, including or excluding optional features. In this example, the computer-readable medium includes instructions to detect a key phrase in the audio data. The verification score is to be generated in response to the detection of the key phrase.

Example 23 includes the computer-readable medium of any one of examples 21 to 22, including or excluding optional features. In this example, the computer-readable medium includes instructions to calculate a text-dependent score based on the key phrase and a text-independent score based on a command in the audio data, combine the text dependent score and the text independent score to generate a speaker verification score, and generate the verification score based on the speaker verification score.

Example 24 includes the computer-readable medium of any one of examples 21 to 23, including or excluding optional features. In this example, the computer-readable medium includes instructions to generate a signal quality score based on the audio data, and generate the verification score based on the signal quality score. The signal quality score is based on a background noise level, an input signal level, a signal to noise ratio, a reverberation measure, a duration of the input, or any combination thereof.

Example 25 includes the computer-readable medium of any one of examples 21 to 24, including or excluding optional features. In this example, the computer-readable medium includes instructions to generate a signal quality score based on the audio data, generate a speaker verification score based on the audio data and a speaker model, and generate the verification score based on the signal quality score and the speaker verification score.

Example 26 includes the computer-readable medium of any one of examples 21 to 25, including or excluding optional features. In this example, the computer-readable medium includes instructions to preprocess the audio data to remove noise from the audio data.

Example 27 includes the computer-readable medium of any one of examples 21 to 26, including or excluding optional features. In this example, the computer-readable medium includes instructions to extract features from the audio data, generating a speaker verification score based on the extracted features, and generating the verification score based on the speaker verification score.

Example 28 includes the computer-readable medium of any one of examples 21 to 27, including or excluding optional features. In this example, the computer-readable medium includes instructions to detect an unknown user in response to receiving additional audio data from the user, generating an updated verification score based on the additional audio data, and detecting that the updated verification score exceeds a lower threshold but does not exceed a higher threshold.

Example 29 includes the computer-readable medium of any one of examples 21 to 28, including or excluding optional features. In this example, the computer-readable medium includes instructions to detect a known user in response to detecting that the verification score exceeds the higher threshold score and generate a response to the audio data based on the detected known user.

Example 30 includes the computer-readable medium of any one of examples 21 to 29, including or excluding optional features. In this example, the computer-readable medium includes instructions to detect an unknown user in response to detecting that the verification score does not exceed the lower threshold score.

Example 31 is a system for generating dialogue. The system includes an audio receiver to receive audio data including speech. The system includes a verification score generator to generate a verification score based on the audio data. The system also includes a user detector to detect that the verification score exceeds a lower threshold but does not exceed a higher threshold. The system further includes a dialogue generator to generate a dialogue to solicit additional audio data to be used to generate an updated verification score in response to detecting that the verification score exceeds a lower threshold but does not exceed a higher threshold.

Example 32 includes the system of example 31, including or excluding optional features. In this example, the system includes a key phrase detector to detect a key phrase in the audio data. The verification score generator is to generate a verification score based on the audio data in response to the detection of the key phrase.

Example 33 includes the system of any one of examples 31 to 32, including or excluding optional features. In this example, the system includes a speaker scorer to generate a speaker verification score based on the audio data and a speaker model. The verification score is at least in part based on the speaker verification score.

Example 34 includes the system of any one of examples 31 to 33, including or excluding optional features. In this example, the system includes a speaker scorer to generate a speaker verification score based on the audio data and a speaker model. The speaker scorer is to calculate a text-dependent score based on the key phrase and a text-independent score based on a command in the audio data, and combine the text-dependent score and the text independent score to generate the speaker verification score. The verification score is at least in part based on the speaker verification score.

Example 35 includes the system of any one of examples 31 to 34, including or excluding optional features. In this example, the system includes a signal quality scorer to generate a signal quality score based on the audio data. The verification score is at least in part based on the signal quality score.

Example 36 includes the system of any one of examples 31 to 35, including or excluding optional features. In this example, the system includes a signal quality scorer to generate a signal quality score based on the audio data. The signal quality score is based on a background noise level, an input signal level, a signal to noise ratio, a reverberation measure, a duration of the input, or any combination thereof. The verification score is at least in part based on the signal quality score.

Example 37 includes the system of any one of examples 31 to 36, including or excluding optional features. In this example, the system includes a preprocessor to preprocess the audio data to remove noise.

Example 38 includes the system of any one of examples 31 to 37, including or excluding optional features. In this example, the system includes a feature extractor to extract features from the audio data. The system includes a speaker scorer to generate a speaker verification score based on the extracted features and the verification score generator is to generate the verification score based on the speaker verification score.

Example 39 includes the system of any one of examples 31 to 38, including or excluding optional features. In this example, the user detector is to detect an unknown user in response to receiving the additional audio data from the user, and detect that the updated verification score exceeds a lower threshold but does not exceed a higher threshold. The verification score generator is to generate an updated verification score based on the additional audio data.

Example 40 includes the system of any one of examples 31 to 39, including or excluding optional features. In this example, the user detector is to detect a known user in response to detecting that the verification score exceeds the higher threshold score, the dialogue generator to generate a response to the audio data based on the detected known user.

Example 41 is a system for generating dialogue. The system includes means for receiving audio data including speech. The system also includes means for generating a verification score based on the audio data. The system further includes means for detecting that the verification score exceeds a lower threshold but does not exceed a higher threshold. The system further includes means for generating a dialogue to solicit additional audio data to be used to generate an updated verification score in response to detecting that the verification score exceeds a lower threshold but does not exceed a higher threshold.

Example 42 includes the system of example 41, including or excluding optional features. In this example, the system includes means for detecting a key phrase in the audio data. The means for generating the verification score is to generate a verification score based on the audio data in response to the detection of the key phrase.

Example 43 includes the system of any one of examples 41 to 42, including or excluding optional features. In this example, the system includes means for generating a speaker verification score based on the audio data and a speaker model. The verification score is at least in part based on the speaker verification score.

Example 44 includes the system of any one of examples 41 to 43, including or excluding optional features. In this example, the system includes means for generating a speaker verification score based on the audio data and a speaker model. The means for generating the speaker verification score is to calculate a text-dependent score based on the key phrase and a text-independent score based on a command in the audio data, and combine the text-dependent score and the text independent score to generate the speaker verification score. The verification score is at least in part based on the speaker verification score.

Example 45 includes the system of any one of examples 41 to 44, including or excluding optional features. In this example, the system includes means for generating a signal quality score based on the audio data. The verification score is at least in part based on the signal quality score.

Example 46 includes the system of any one of examples 41 to 45, including or excluding optional features. In this example, the system includes means for generating a signal quality score based on the audio data. The signal quality score is based on a background noise level, an input signal level, a signal to noise ratio, a reverberation measure, a duration of the input, or any combination thereof. The verification score is at least in part based on the signal quality score.

Example 47 includes the system of any one of examples 41 to 46, including or excluding optional features. In this example, the system includes means for preprocessing the audio data to remove noise.

Example 48 includes the system of any one of examples 41 to 47, including or excluding optional features. In this example, the system includes means for extracting features from the audio data. The means for generating a speaker verification score is to generate a speaker verification score based on the extracted features and the means for generating the verification score is to generate the verification score based on the speaker verification score.

Example 49 includes the system of any one of examples 41 to 48, including or excluding optional features. In this example, the means for detecting that the verification score exceeds the lower threshold but does not exceed the higher threshold is to detect an unknown user in response to receiving the additional audio data from the user, and detect that the updated verification score exceeds a lower threshold but does not exceed a higher threshold. The means for generating the verification score is to generate an updated verification score based on the additional audio data.

Example 50 includes the system of any one of examples 41 to 49, including or excluding optional features. In this example, the means for detecting that the verification score exceeds the lower threshold but does not exceed the higher threshold is to detect a known user in response to detecting that the verification score exceeds the higher threshold score, the means for generating the dialogue to generate a response to the audio data based on the detected known user.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for generating dialogue, comprising:
   an audio receiver to receive audio data comprising speech;
   a verification score generator to generate a verification score based on the audio data;
   a speaker scorer to generate a speaker verification score based on the audio data and a speaker model, wherein the speaker scorer is to calculate a text-dependent score based on a key phrase and a text-independent score based on a command in the audio data, and combine the text-dependent score and the text-independent score to generate the speaker verification score, wherein the verification score is at least in part based on the speaker verification score;
   a user detector to detect that the verification score exceeds a lower threshold but does not exceed a higher threshold; and
   a dialogue generator to generate a dialogue to solicit additional audio data to be used to generate an updated verification score in response to detecting that the verification score exceeds the lower threshold but does not exceed the higher threshold.

2. The apparatus of claim 1, comprising a key phrase detector to detect the key phrase in the audio data, wherein the verification score generator is to generate the verification score based on the audio data in response to the detection of the key phrase.

3. The apparatus of claim 1, wherein the verification score is at least in part based on the speaker verification score.

4. The apparatus of claim 1, comprising a signal quality scorer to generate a signal quality score based on the audio data, wherein the verification score is at least in part based on the signal quality score.

5. The apparatus of claim 1, comprising a signal quality scorer to generate a signal quality score based on the audio data, wherein the signal quality score is based on a background noise level, an input signal level, a signal to noise ratio, a reverberation measure, a duration of an input, or any combination thereof, and wherein the verification score is at least in part based on the signal quality score.

6. The apparatus of claim 1, comprising a preprocessor to preprocess the audio data to remove noise.

7. The apparatus of claim 1, comprising a feature extractor to extract features from the audio data, wherein the speaker scorer is to generate the speaker verification score based on the extracted features and the verification score generator is to generate the verification score based on the speaker verification score.

8. The apparatus of claim 1, wherein the user detector is to detect an unknown user in response to receiving the additional audio data from a user, and detect that the updated verification score exceeds the lower threshold but does not exceed the higher threshold, wherein the verification score generator is to generate the updated verification score based on the additional audio data.

9. The apparatus of claim 1, wherein the user detector is to detect a known user in response to detecting that the verification score exceeds the higher threshold, the dialogue generator to generate a response to the audio data based on the detected known user.

10. A method for generating dialogue, comprising:
    receiving, via a processor, audio data comprising speech;
    generating, via the processor, a verification score based on the audio data wherein generating the verification score comprises calculating a text-dependent score based on a key phrase and a text-independent score based on a command in the audio data and combining the text-dependent score and the text-independent score to generate a speaker verification score and generating the verification score based on the speaker verification score;
    detecting, via the processor, that the verification score exceeds a lower threshold but does not exceed a higher threshold; and
    generating, via the processor, a dialogue to solicit additional audio data to be used to generate an updated verification score in response to detecting that the verification score exceeds the lower threshold but does not exceed the higher threshold.

11. The method of claim 10, comprising detecting, via the processor, the key phrase in the audio data, wherein generating the verification score is performed in response to the detection of the key phrase.

12. The method of claim 10, wherein generating the verification score comprises generating a signal quality score based on the audio data and generating the verification score based on the signal quality score, wherein the signal quality score is based on a background noise level, an input signal level, a signal to noise ratio, a reverberation measure, a duration of an input, or any combination thereof.

13. The method of claim 10, wherein generating the verification score comprises generating a signal quality score based on the audio data, generating the speaker verification score based on the audio data and a speaker model, and generating the verification score based on the signal quality score and the speaker verification score.

14. The method of claim 10, comprising preprocessing, via the processor, the audio data to remove noise from the audio data.

15. The method of claim 10, comprising extracting, via the processor, features from the audio data and generating speaker verification score based on the extracted features.

16. The method of claim 10, comprising detecting, via the processor, an unknown user in response to receiving additional audio data from a user, generating the updated verification score based on the additional audio data, and detecting that the updated verification score exceeds the lower threshold but does not exceed the higher threshold.

17. The method of claim 10, comprising detecting, via the processor, a known user in response to detecting that the verification score exceeds the higher threshold and generate a response to the audio data based on the detected known user.

18. The method of claim 10, comprising detecting, via the processor, an unknown user in response to detecting that the verification score does not exceed the lower threshold.

19. At least one non-transitory computer readable medium for generating dialogue having instructions stored therein that, in response to being executed on a computing device, cause the computing device to:
   receive audio data comprising speech;
   generate a verification score based on the audio data, wherein the computing device is to calculate a text-dependent score based on a key phrase and a text-independent score based on a command in the audio data, combine the text-dependent score and the text-independent score to generate a speaker verification score, and generate the verification score based on the speaker verification score;
   detect that the verification score exceeds a lower threshold but does not exceed a higher threshold; and
   generate a dialogue to solicit additional audio data to be used to generate an updated verification score in response to detecting that the verification score exceeds the lower threshold but does not exceed the higher threshold.

20. The at least one non-transitory computer readable medium of claim 19, comprising instructions to detect the key phrase in the audio data, wherein the verification score is to be generated in response to the detection of the key phrase.

21. The at least one non-transitory computer readable medium of claim 19, comprising instructions to generate a signal quality score based on the audio data, and generate the verification score based on the signal quality score, wherein the signal quality score is based on a background noise level, an input signal level, a signal to noise ratio, a reverberation measure, a duration of an input, or any combination thereof.

22. The at least one non-transitory computer readable medium of claim 19, comprising instructions to generate a signal quality score based on the audio data, generate the speaker verification score based on the audio data and a speaker model, and generate the verification score based on the signal quality score and the speaker verification score.

* * * * *